United States Patent [19]

Sumner, Jr. et al.

[11] Patent Number: 5,296,587

[45] Date of Patent: Mar. 22, 1994

[54] COPOLYMERIZATION OF DICARBOXYLIC ACIDS AND DIALKYL ESTERS OF DICARBOXYLIC ACIDS TO FORM POLYESTERS

[75] Inventors: Charles E. Sumner, Jr., Kingsport; Gary D. Boone, Johnson City, both of Tenn.

[73] Assignee: Eastman Chemical Company, Kingsport, Tenn.

[21] Appl. No.: 34,963

[22] Filed: Mar. 22, 1993

[51] Int. Cl.$^5$ ............................................. C08G 63/78
[52] U.S. Cl. .................................. 528/281; 528/272; 528/275; 528/277; 528/283; 528/285; 528/298; 528/301; 528/302; 528/307; 528/308; 528/308.6
[58] Field of Search ................ 528/272, 275, 277, 281, 528/283, 285, 298, 301, 302, 307, 308, 308.6

[56] References Cited

U.S. PATENT DOCUMENTS 4,066,624 1/1978 Kawase et al. ..................... 528/173

Primary Examiner—John Kight, III
Assistant Examiner—S. A. Acquah
Attorney, Agent, or Firm—John D. Thallemer; William P. Heath, Jr.

[57] ABSTRACT

The present invention relates to a process for copolymerizing a dicarboxylic acid, a dialkyl ester, and a diol in the presence of a transesterification catalyst. The process involves heating a mixture containing carboxylic acids and esters in excess diol at elevated temperatures in the presence of a transesterification catalyst and returning any vaporized diol to the reaction vessel until the theoretical amount of alcohol and/or water have been evolved. The alcohol and/or water of reaction is not allowed to return to the vessel. When the theoretical weight of alcohol and/or water is collected, the excess diol is removed and the polymerization is allowed to proceed.

22 Claims, No Drawings

COPOLYMERIZATION OF DICARBOXYLIC ACIDS AND DIALKYL ESTERS OF DICARBOXYLIC ACIDS TO FORM POLYESTERS

FIELD OF THE INVENTION

The present invention relates to a process for copolymerizing a dicarboxylic acid, a dialkyl ester, and a diol in the presence of a transesterification catalyst. The process involves heating a mixture containing carboxylic acids and esters in excess diol at elevated temperatures in the presence of a transesterification catalyst and returning any vaporized diol to the reaction vessel until the theoretical amount of alcohol and/or water have been evolved. The alcohol and/or water of reaction is not allowed to return to the vessel. When the theoretical weight of alcohol and/or water is collected, the excess diol is removed and the polymerization is allowed to proceed.

BACKGROUND OF THE INVENTION

Polyesters are widely used as extrusion and injection molding resins for the fabrication of various articles for household or industrial use, including appliance parts, containers and auto parts. A majority of the polyesters are composed of polyethylene terephthalate (PET) or materials where PET has been modified by the addition of other diols and/or dicarboxylic acid esters. The polyesters are usually prepared by reacting a dialkyl ester of a dicarboxylic acid and a diol, for example, dimethylterephthalate and ethylene glycol in the presence of a transesterification catalyst.

In the above mentioned polymerization reaction, trace amounts of dicarboxylic acids deactivate the transesterification catalysts resulting in undesirable prolonged transesterification times or no ester exchange. If zinc or manganese are used as the transesterification catalyst, the catalyst is rendered essentially ineffective. This severely limits the monomers which can be used to prepare a polyester. For example, in order to copolymerize a dicarboxylic acid with dimethylterephthalate, the dicarboxylic acid must be converted to its corresponding dicarboxylic acid ester. Therefore, it would be economically advantageous to be able to polymerize a mixture containing a dialkyl ester of a dicarboxylic acid and a dicarboxylic acid in the presence of standard transesterification catalysts.

The process of the present invention has eliminated the need to convert a dicarboxylic acid to its corresponding diester before copolymerizing it with a dimethyl ester of a carboxylic acid in the presence of standard transesterification catalysts.

SUMMARY OF THE INVENTION

It is therefore an object of the present invention to provide a process for preparing copolyesters using a dicarboxylic acid, a dimethyl ester of a dicarboxylic acid, and a diol in the presence of a transesterification catalyst.

Another object of the invention is to copolymerize a dicarboxylic acid with a dimethyl ester of a dicarboxylic acid without converting the dicarboxylic acid to its corresponding diester in the presence of standard transesterification catalysts.

A further object of the invention is to provide a copolyester which exhibits excellent mechanical properties such as impact resistance, stress crack resistance and heat resistance.

These and other objects are accomplished herein by a process for preparing a polyester or copolyester, said process comprises the following steps:

(I) reacting
(A) a dicarboxylic acid or a copolymerizable carboxylic acid wherein the copolymerizable carboxylic acid contains a primary alkyl ester group having 1 to 6 carbon atoms;
(B) a dimethyl ester of a dicarboxylic acid; and
(C) a diol, in the presence of at least one transesterification catalyst at temperatures in the range of 150° C. to 300° C., and pressures of atmospheric to about 0.2 mm Hg wherein the concentration of diol is maintained at a level equal to at least a 2% molar excess of the total concentration of components (A) and (B); (II) polycondensing the reaction product of Step (I) to form a copolyester under increased temperature and reduced pressure while excess diol is removed.

The polyester or copolyester may be post reacted in the solid state by heating the solid polyester or copolyester to a temperature below the melting temperature of the polyester or copolyester in a vacuum or in a stream of inert gas.

DESCRIPTION OF THE INVENTION

The first step for preparing the copolyester of the present invention involves reacting a dicarboxylic acid or a copolymerizable carboxylic acid, a dimethyl ester of a dicarboxylic acid and a diol. The dicarboxylic acids or copolymerizable carboxylic acids and dimethyl esters of dicarboxylic acids, and one or more diols are heated in the presence of transesterification catalysts at temperatures in the range of 150° C. to 300° C., and pressures of atmospheric to 0.2 mm Hg. Normally, the dicarboxylic acids and dimethyl esters of dicarboxylic acids are esterified or transesterified with the diol(s) at atmospheric pressure and at a temperature at the lower end of the specified range, preferably 175° C. to 200° C. The reaction between the dicarboxylic acid and diol produces an ester and water. The reaction between the dimethyl ester of a dicarboxylic acid and diol produces an ester and methanol.

In Step (I), the water and/or methanol are collected and measured as they are produced. The water and methanol are not added back to the reaction. The concentration of diol is maintained at a level equal to at least a 2% molar excess of the total concentration of components (A) and (B). Preferably, the concentration of diol is maintained at a level equal to a 5% to 200% molar excess of the total concentration of components (A) and (B). It is important to note that a certain percentage of diol codistills with the methanol and water. A certain amount of diol is unrecoverable. Thus, a supply of diol is necessary to replenish the reaction. The present inventors have determined that the diol amount in the reaction is preferably replenished after collecting the water and methanol for a period of 15 minutes to 4 hours, preferably one hour to two hours.

Dicarboxylic acids useful in the process include aromatic dicarboxylic acids preferably having 8 to 14 carbon atoms, aliphatic dicarboxylic acids preferably having 4 to 12 carbon atoms, or cycloaliphatic dicarboxylic acids preferably having 8 to 12 carbon atoms. Examples of such dicarboxylic acids are: terephthalic acid, phthalic acid, isophthalic acid, naphthalene-2,6-dicarboxylic acid, 1,3-phenylenedioxy diacetic acid, cyclohexanedicarboxylic acid, cyclohexanediacetic acid, diphenyl-4,4'-dicarboxylic acid, succinic acid, glutaric acid, adipic acid, azelaic acid, sebacic acid, and the like. Copolyesters may be prepared from two or more of the above dicarboxylic acids. It should be understood that use of the corresponding acid anhydrides and acid chlorides of these acids is included in the term "dicarboxylic acid".

Copolymerizable carboxylic acids include carboxylic acids containing a primary alkyl ester group having 1 to 6 carbon atoms. A preferred copolymerizable carboxylic acid is methyl hydrogen terephthalate.

Dimethyl esters of dicarboxylic acids include dimethyl esters of any of the above mentioned dicarboxylic acids. Copolyesters may be prepared from two or more dimethyl esters of dicarboxylic acids. Dialkyl esters, having 2 to 4 carbon atoms, of dicarboxylic acids may be substituted for the dimethyl esters of the present invention. If a dialkyl ester other than a dimethyl ester of a dicarboxylic acid is used, the by product will not be methanol, but some other alcohol.

Diols useful in the process include cycloaliphatic diols preferably having 6 to 20 carbon atoms or aliphatic diols preferably having 3 to 20 carbon atoms. Examples of such diols are: ethylene glycol, diethylene glycol, triethylene glycol, 1,4-cyclohexanedimethanol, propane-1,3-diol, butane-1,4-diol, pentane-1,5-diol, hexane-1,6-diol, 3-methylpentanediol-(2,4), 2-methylpentanediol-(1,4), 2,2,4-trimethylpentane-diol-(1,3), 2-ethylhexanediol-(1,3), 2,2-diethylpropane-diol-(1,3), hexanediol (1,3), 1,4-di-(hydroxyethoxy)-benzene, 2,2-bis-(4-hydroxycyclohexyl)-propane, 2,4-dihydroxy-1,1,3,3-tetramethyl-cyclobutane, 2,2-bis-(3-hydroxyethoxyphenyl)-propane, and 2,2-bis-(4-hydroxypropoxyphenyl)-propane. Copolyesters may be prepared from two or more of the above diols. In the case where two or more diols are used, the diol with the lowest boiling point is back added to the reaction.

Copolyesters comprising substantially only terephthalic acid, dimethyl terephthalate, and ethylene glycol are preferred in the case where the blends of the present invention are used in making thermoformed crystallized polyethylene terephthalate articles.

Step (II) of the process of the invention involves polycondensing the esters formed in Step (I) to form copolyesters. Polycondensation is effected by increasing the temperature and lowering the pressure while excess diol is removed from the mixture. The polycondensation reaction is continued until the inherent viscosity of the polymer melt reaches about 0.35 dl/g or greater. At this point, the melt is cooled to produce a solid which is pelletized, chopped, etc.

Suitable transesterification or esterification catalysts are employed in Steps (I) and (II) to speed up the rate of reaction. The type and amount of such catalysts are well known to those skilled in the art of producing copolyesters. Specific catalysts include titanium, manganese, tin, zinc, antimony, germanium, alkali or alkaline earth metal salts, phosphorous, calcium and combinations thereof. The catalysts according to the process may be added to the reaction mix at the beginning of Step (I). The decision to add a catalyst at the beginning of Step (I) or at anytime prior to Step (II) depends on the dicarboxylic acid used. After Step (I), a phosphate ester may be added to the reaction product before the polycondensation step. The phosphate ester deactivates the transesterification catalyst(s). Suitable phosphate esters include ethyl acid phosphate, diethyl acid phosphate, triethyl acid phosphate, arylalkyl phosphates, tris-2-ethylhexyl phosphate and the like. In any case the catalyst should be added prior to Step (II) or polycondensation. It is important to note that titanium catalyzed polyethylene terephthalate produces a yellow colored polymer which is not a commercially acceptable product. In addition, titanium also causes high levels of diethylene glycol formed during the polymerization which are incorporated into the final product.

Examples of suitable manganese salts are manganous benzoate tetrahydrate, manganese chloride, manganese oxide, manganese acetate, manganese acetylacetonate, manganese succinate, manganese diethyldithiocarbamate, manganese antimonate, manganate phosphate monohydrate, manganese glycol oxide, manganese napthenate, and manganese salicyl salicylate.

Examples of suitable zinc compounds include zinc acetate, zinc phosphate monohydrate, zinc succinate, and zinc glycoxide, etc.

Examples of suitable calcium compounds include calcium acetate, calcium glycoxide, and calcium phosphate monohydrate, etc.

Examples of suitable antimony compounds include antimony triacetate, antimony trioxide, antimony glycolate(either formed separately or during polymerization), and the like, with antimony triacetate being preferred.

Optionally, the molecular weight of the polyesters or copolyesters produced by the process of this invention can be built up by solid state polymerization. Solid state polymerization is used because polymerization in Step (II) to high molecular weight causes thermal degradation of the polymer. In solid state polymerization, excess diol is removed from polyester or copolyester pellets by circulating or blowing an inert gas, such as nitrogen, through the pellets. A polycondensation reaction is conducted in the solid state at temperatures in the range of 200° C. to 300° C. The solid state polycondensation reaction is continued until the inherent viscosity of the polymer reaches 0.70 dl/g or greater. It has been determined that in order to solid state a polyester or copolyester less than 0.1 weight percent, preferably 0.02 to 0.04 weight percent methanol is required as determined by gas chromatography. The weight percent methanol is an indicator of the unreacted methyl groups on the dimethyl ester of a dicarboxylic acid. Such unreacted methyl groups indicate an incomplete transesterification reaction.

The materials and testing procedures used for the results shown herein are as follows:

Inherent viscosity (I.V.) was measured at 23° C. using 0.50 grams of polymer per 100 ml of a solvent consisting of 60% by weight phenol and 40% by weight tetrachloroethane.

Gas chromatography was used to determine weight percent methanol.

NMR was used to determine mole percent of 1,3-phenylenedioxydiacetic acid.

The invention will be further illustrated by a consideration of the following examples, which are intended to be exemplary of the invention and are not to limit the invention to any particular isomeric composition. All parts and percentages in the examples are on a weight basis unless otherwise stated.

EXAMPLE 1

Dimethyl terephthalate (31.83 moles, 13.60 lb.), (1,3-phenylenedioxy) diacetic acid (2.77 moles, 1.38 lb.), ethylene glycol (86.48 moles, 11.81 lb.), manganese acetate (75 ppm Mn), and cobalt acetate (100 ppm Co) as a toner, were charged to a 10 gallon stainless steel reactor. The mixture was allowed to react under nitrogen at 195° C. for 1 hour. Additional ethylene glycol equal to the amount of water, methanol and ethylene glycol collected in the condenser trap was then added to the reaction. The reaction was allowed to continue at 195° C. for 2 hours at which time the temperature was increased to 215° C. for 1.25 hours. The temperature was then increased to 270° C. with the phosphorus being added when the temperature reached 230° C. After five minutes, germanium dioxide (200 ppm GE) and antimony triacetate (50 ppm Sb) catalysts were added. Vacuum was applied when the temperature reached 250° C. and held for one hour after the temperature reached 270° C.

The inherent viscosity was determined to be 0.438. Gas chromatography indicated 0.021 weight percent methanol. NMR indicated 7.8 mole percent (1,3-phenylenedioxy) diacetic acid.

Approximately 3 millimeter size particles of the copolyester were heated to 207° C. in a fluidized bed reactor unit and continuously flushed with nitrogen for 6–8 hours. After solid stating, the inherent viscosity of the copolyester increased to 0.95 dl/g indicating a significant increase in molecular weight.

EXAMPLE 2

Comparative Example wherein the level of diol was not maintained.

Dimethyl terephthalate, 13.60 pounds (31.83 moles), 1,3-phenylenedioxy diacetic acid, 1.38 pounds (2.77 moles), ethylene glycol, 11.81 pounds (86.48 moles), manganese (75 ppm Mn), germanium dioxide, (200 ppm germanium), and cobalt acetate (100 ppm Co), were charged to a ten gallon stainless steel reactor equipped with a double helical stirrer. The mixture was heated under nitrogen at 195° C. for 2.0 hours and 215° C. for 1.25 hours. Phosphorus was then added to the reaction and the reaction temperature was increased to 270° C. Vacuum was applied when the reaction temperature reached 265° C. and was held for one hour after 270° C. was achieved. A crystalline polymer resulted.

The inherent viscosity of the polymer was determined to be 0.49 dl/g. The polymer was analyzed by gas chromatography and NMR which indicated that the polymer contained 0.298 weight percent methanol and 7.8 mole percent 1,3-phenylenedioxydiacetic acid. This weight percent methanol indicates a high percentage of methyl groups which indicates incomplete transesterification.

Particles (approximately 3 mm) of this copolyester were heated to 207° C. in a fluidized bed reactor and continuously flushed with nitrogen for 16 hours. The inherent viscosity increased to only 0.54. Such a low molecular weight polymer has poor performance characteristics and poor physical properties such as tensile strength, modulus and elongation.

Many variations will suggest themselves to those skilled in this art in light of the above detailed description. All such obvious modifications are within the full intended scope of the appended claims.

What is claimed is:

1. A process for preparing a polyester or copolyester, said process comprises the following steps:
   (I) reacting
      (A) a dicarboxylic acid or a copolymerizable carboxylic acid wherein the copolymerizable carboxylic acid contains a primary alkyl ester group having 1 to 6 carbon atoms;
      (B) a dialkyl ester having 2 to 4 carbon atoms of a dicarboxylic acid; and
      (C) a diol,
   in the presence of at least one transesterification catalyst at temperatures in the range of 150° C. to 300° C., and pressures of atmospheric to about 0.2 mm Hg wherein the reaction between the dicarboxylic acid and diol produces an ester and water, and the reaction between the dialkyl ester of a dicarboxylic acid and diol produces an ester and alcohol, provided the concentration of diol is maintained, by backadding the diol to the reaction, at a level equal to at least a 2% molar excess of the total concentration of components (A) and (B); and (II) polycondensing the reaction product of Step (I) to form a polyester or copolyester under increased temperature and reduced pressure while excess diol is removed.

2. The process of claim 1 wherein the polyester or copolyester is post reacted in the solid state by heating the solid polyester or copolyester to a temperature below the melting temperature of the polyester or copolyester in a vacuum or in a stream of inert gas.

3. A process for preparing a polyester or copolyester, said process comprises the following steps:
   (I) reacting
      (A) a dicarboxylic acid or a copolymerizable carboxylic acid wherein the copolymerizable carboxylic acid contains a primary alkyl ester group having 1 to 6 carbon atoms;
      (B) a dimethyl ester of a dicarboxylic acid; and
      (C) a diol,
   in the presence of at least one transesterification catalyst at temperatures in the range of 150° C. to 300° C., and pressures of atmospheric to about 0.2 mm Hg wherein the reaction between the dicarboxylic acid and diol produces an ester and water, and the reaction between the dimethyl ester of a dicarboxylic acid and diol produces an ester and methanol, provided the concentration of diol is maintained, by backadding the diol to the reaction, at a level equal to at least 2% molar excess of the total concentration of components (A) and (B); and
   (II) polycondensing the reaction product of Step (I) to form a polyester or copolyester under increased temperature and reduced pressure while excess diol is removed.

4. The process of claim 3 wherein the polyester or copolyester is post reacted in the solid state by heating the solid polyester or copolyester to a temperature below the melting temperature of the polyester or copolyester in a vacuum or in a stream of inert gas.

5. The process of claim 1 wherein the dicarboxylic acid is selected from the group consisting of aromatic dicarboxylic acids, aliphatic dicarboxylic acids, cycloaliphatic dicarboxylic acids, and mixtures thereof.

6. The process of claim 5 wherein the dicarboxylic acid is selected from the group consisting of terephthalic acid, isophthalic acid, phthalic acid, naphthalene-2,6-dicarboxylic acid, cyclohexanedicarboxylic acid, 1,3-phenylenedioxy diacetic acid, diphenyl 4,4'-dicarboxylic acid, succinic acid, sebacic acid, adipic acid, glutaric acid, azelaic acid and mixtures thereof.

7. The process of claim 6 wherein the dicarboxylic acid is terephthalic acid.

8. The process of claim 1 wherein the copolymerizable carboxylic acid is methyl hydrogen terephthalate.

9. The process of claim 1 wherein the dimethyl ester of a dicarboxylic acid is selected from the group consisting of dimethyl terephthalate and dimethyl isophthalate.

10. The process of claim 1 wherein the diol is selected from the group consisting of aliphatic diols, cycloaliphatic diols, and mixtures thereof.

11. The process of claim 10 wherein the aliphatic diol is selected from the group consisting of ethylene glycol, diethylene glycol, triethylene glycol, ethylene glycol, propanediol, butanediol, pentanediol, hexanediol and mixtures thereof.

12. The process of claim 1 wherein the transesterification catalyst is selected from the group consisting of manganese, tin, zinc, antimony, germanium, and combinations thereof.

13. The process of claim 1 wherein the concentration of diol is maintained at a level equal to a 5% to 200% molar excess of the total concentration of components (A) and (B).

14. The process of claim 1 wherein Step (I) is carried out at 180° C. to 195° C. for 1 to 4 hours and 200° C. to 230° C. for 1 to 3 hours.

15. The process of claim 14 wherein Step (I) is carried out at 195° C. for 2.5 hours and 215° C. 1.5 hours.

16. The process of claim 1 wherein Step (II) is carried out at 200° C. to 300° C. for 2 to 6 hours.

17. The process of claim 16 wherein Step (II) is carried out at 250° C. to 280° C. for 2 to 6 hours.

18. The process of claim 3 wherein less than 0.1 weight percent of the methyl groups on the dimethyl ester of the dicarboxylic acid are unreacted after Step (II).

19. The process of claim 18 wherein less than 0.02 to 0.04 weight percent of the methyl groups on the dimethyl ester of the dicarboxylic acid are unreacted after Step (II).

20. The process of claim 18 wherein the weight percent of the methyl groups on the dimethyl ester of the dicarboxylic acid are determined by using gas chromatography to determine the weight percent methanol.

21. The process of claim 1 wherein the polyester or copolyester has an inherent viscosity of 0.7 to 1.0.

22. The process of claim 1 wherein the polyester is polyethylene terephthalate.

* * * * *